US011518215B2

(12) United States Patent
Eichhorn et al.

(10) Patent No.: US 11,518,215 B2
(45) Date of Patent: Dec. 6, 2022

(54) AIR OUTLET APPARATUS FOR AN INTERIOR OF A MOTOR VEHICLE, AND SYSTEM

(71) Applicant: Bayerische Motoren Werke Aktiengesellschaft, Munich (DE)

(72) Inventors: Julian Eichhorn, Menlo Park, CA (US); Christian Froemel, Kolbermoor (DE); Jasper Stern, Munich (DE); Rene Zocher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 392 days.

(21) Appl. No.: 16/811,692

(22) Filed: Mar. 6, 2020

(65) Prior Publication Data
US 2020/0207181 A1 Jul. 2, 2020

Related U.S. Application Data

(63) Continuation of application No. PCT/EP2018/063752, filed on May 25, 2018.

(30) Foreign Application Priority Data

Sep. 7, 2017 (DE) .................... 10 2017 215 809.3

(51) Int. Cl.
*B60H 1/00* (2006.01)
*B60K 37/02* (2006.01)
*B60H 1/34* (2006.01)

(52) U.S. Cl.
CPC ..... *B60H 1/00985* (2013.01); *B60H 1/00821* (2013.01); *B60K 37/02* (2013.01);
(Continued)

(58) Field of Classification Search
CPC ............ B60H 1/00985; B60H 1/00821; B60H 1/00742; B60H 2001/00214;
(Continued)

(56) References Cited

U.S. PATENT DOCUMENTS

2011/0258566 A1* 10/2011 Oustiougov ............ G06F 3/048
715/766
2014/0232140 A1* 8/2014 Nagai .................... B60K 35/00
296/193.02
(Continued)

FOREIGN PATENT DOCUMENTS

DE 299 15 938 U1 11/1999
DE 102 58 955 A1 7/2004
(Continued)

OTHER PUBLICATIONS

International Search Report (PCT/ISA/210) issued in PCT Application No. PCT/EP2018/063752 dated Aug. 29, 2018 with English translation (six (6) pages).
(Continued)

*Primary Examiner* — Emmanuel E Duke
(74) *Attorney, Agent, or Firm* — Crowell & Moring LLP

(57) ABSTRACT

An air outlet apparatus for an interior of a motor vehicle includes a first ventilation gap and a second ventilation gap, which are spaced apart from each other, a decorative element, which is coupled to a fitting covering for the motor vehicle and arranged between the first and the second ventilation gap, and a control unit, which is coupled to the decorative element and has a first regulating element and a second regulating element. An intensity of an air flow through at least one of the ventilation gaps and, by way of the second regulating element, an alignment of the air flow through at least one of the ventilation gaps can be adjusted independently of each other.

20 Claims, 7 Drawing Sheets

(52) U.S. Cl.
CPC .............. *B60H 1/00742* (2013.01); *B60H 2001/00214* (2013.01); *B60H 2001/3471* (2013.01)

(58) Field of Classification Search
CPC .......... B60H 2001/3471; B60H 1/3414; B60H 1/242; B60K 37/02
See application file for complete search history.

(56) References Cited

U.S. PATENT DOCUMENTS

| | | |
|---|---|---|
| 2016/0137028 A1 | 5/2016 | Trego et al. |
| 2016/0311293 A1 | 10/2016 | Wunderlich et al. |
| 2018/0105023 A1 | 4/2018 | Nakamura et al. |
| 2019/0100078 A1* | 4/2019 | Fusco .................... B60H 1/242 |

FOREIGN PATENT DOCUMENTS

| | | | |
|---|---|---|---|
| DE | 102009001412 A1 * | 9/2010 | |
| DE | 102009001412 A1 * | 9/2010 | ............. B60K 35/00 |
| DE | 10 2011 000 924 A1 | 8/2012 | |
| DE | 20 2014 007 673 U1 | 1/2016 | |
| DE | 10 2015 120 008 A1 | 5/2016 | |
| DE | 10 2015 005 126 B3 | 6/2016 | |
| WO | WO 2016/157791 A1 | 10/2016 | |

OTHER PUBLICATIONS

German-language Written Opinion (PCT/ISA/237) issued in PCT Application No. PCT/EP2018/063752 dated Aug. 29, 2018 (seven (7) pages).

German-language Search Report issued in German Application No. 10 2017 215 809.3 dated Mar. 20, 2018 with partial English translation (15 pages).

* cited by examiner

AIR OUTLET APPARATUS FOR AN INTERIOR OF A MOTOR VEHICLE, AND SYSTEM

CROSS REFERENCE TO RELATED APPLICATIONS

This application is a continuation of PCT International Application No. PCT/EP2018/063752, filed May 25, 2018, which claims priority under 35 U.S.C. § 119 from German Patent Application No. 10 2017 215 809.3, filed Sep. 7, 2017, the entire disclosures of which are herein expressly incorporated by reference.

BACKGROUND AND SUMMARY OF THE INVENTION

The invention relates to an air outlet apparatus for an interior of a motor vehicle, which makes possible simple and reliable operator control for air-conditioning of the interior and can contribute to increased comfort of the motor vehicle. The invention furthermore relates to a system having such an air outlet apparatus.

Motor vehicles generally have one or more air vents for the air-conditioning of vehicle interiors, which for example make it possible to adjust the direction and intensity of an airflow by means of mechanically connected tabs. Such tabs usually make it possible to mechanically control airflows in locally delimited regions in a restricted manner and also only insufficiently satisfy the esthetic requirements of many motor vehicle owners.

It is an object on which the invention is based to provide an air outlet apparatus for an interior of a motor vehicle, which makes possible simple and reliable operator control for the air-conditioning of the interior and also contributes to increased comfort of the motor vehicle.

In accordance with one aspect of the invention, an air outlet apparatus for an interior of a motor vehicle comprises a first and a second ventilation gap, which are arranged spaced apart from one another. The air outlet apparatus also comprises a decorative element, which is coupled to a dashboard paneling for the motor vehicle and which is arranged between the first and the second ventilation gap. The air outlet apparatus furthermore comprises an operator control unit, which is coupled to the decorative element and which has a first regulating element and a second regulating element, wherein, by means of the first regulating element, an intensity of an airflow through at least one of the ventilation gaps and, by means of the second regulating element, an alignment of the airflow through at least one of the ventilation gaps can be adjusted independently of one another.

By means of the described air outlet apparatus, a simple and reliable operator control concept for the air-conditioning of the interior of a motor vehicle is able to be realized, which concept can also contribute to increased comfort of the motor vehicle. In particular, by means of the described air outlet apparatus, simple and comfortable operator control of concealed air vents, such as register vents, is able to be realized.

In this connection, a register vent denotes an electrified air vent, which is arranged in a concealed manner, which can be actuated electronically and the airflow properties of which can be adjusted by means of two laminar individual streams oriented slightly toward one another. A resulting overall stream is directed here in different directions depending on speed differences between the two individual streams and can enter the interior of the motor vehicle through the first and/or the second ventilation gap.

By means of the described air outlet apparatus, an electronic display operator control concept is able to be realized, which is beneficial in particular for electrified air vents, such as register vents, since such air vents are generally not formed to be directly adjustable and the current operating status thereof is not displayed directly.

In an installed state of the air outlet apparatus, the decorative element faces toward the interior of the motor vehicle and executes veneering to cover a section of the air outlet apparatus in order to cover for example a flap mechanism arranged to control the airflow in an air channel of the air outlet apparatus. The decorative element can be arranged so that it delimits a bottom side of the first ventilation gap and a top side of the second ventilation gap, wherein the first ventilation gap implements for example an upper ventilation access and the second ventilation gap realizes a lower ventilation access to the interior of the motor vehicle based on a vertical of an operationally ready motor vehicle. The decorative element satisfies functional requirements and also an esthetic aspect and contributes to the comfort of the motor vehicle.

In accordance with a preferred development of the air outlet apparatus, the first and the second regulating element each have a touch-sensitive surface element, which is integrated into the decorative element. In addition, the air outlet apparatus comprises a control unit, which is coupled in terms of signal technology to the first and the second regulating element so that a position of an object on one of the touch-sensitive surface elements of the first and/or second regulating element can be identified by means of the control unit and as a result the airflow can be controlled electrically by means of the regulating elements.

The two regulating elements preferably each have a capacitive operator control display having an illuminant, which operator control display is integrated into the decorative element and by means of which the airflow can be controlled electrically. Such a capacitive 2D sensor system makes it possible to comfortably control the airflow of the air outlet apparatus according to a touchpad and can also be arranged in a concealed manner in the decorative element. A modified adjustment of the airflow is implemented by means of the control unit via actuating motors on the air vent, which are coupled for example to a flap mechanism of air control flaps.

The decorative element is formed for example as a wood element through which light can partly shine and in which the regulating elements including the operator control display and the illuminant are embedded. For example, a respective operator control display with illuminant is formed as a touch-sensitive high-resolution pixel matrix, which is arranged below a surface of the decorative element, which faces toward the interior of the motor vehicle. Such an operator control display integrated into the decorative element makes it possible, in cooperation with the control unit, to adjust the direction and the intensity and where necessary also to set up a desired diffusion or focusing of the air stream emerging through the ventilation slots or ventilation gaps into the interior. As an alternative, one or both operator control displays are realized as low-resolution segment displays, which have one or more arranged LEDs as illuminant.

In accordance with one development of the air outlet apparatus, the control unit is configured to activate the respective illuminant of the respective operator control display in an operating state in which an object is identified on one of the touch-sensitive surface elements of the first or second regulating element. For example, by touching the decorative element with a finger or a hand, an operator control display can be activated and/or illuminated so that a function selection becomes visible.

Furthermore, the air outlet apparatus can advantageously comprise a position element, which is configured to display a position of the first and/or second regulating element in relation to the decorative element. In particular in relation to the concealed arrangement of the operator control displays that is described above, which displays are activated and/or illuminated by means of contact, a position element is beneficial for making it possible to rapidly find the operator control displays even in a non-activated or non-illuminated state.

Such a position element can be arranged or formed as a marking in the form of a point or an arrow in or on the decorative element. The position element preferably has an illuminant and is coupled in terms of signal technology to the control unit so that the position element can be actuated by means of the control unit. The illuminant of the position element is activated and illuminated to find the operator control displays in a rest state in which no object or hand contact is identified on one of the touch-sensitive surface elements of the first or second regulating element. The illuminant of the position element is deactivated by the control unit in an operating state in which an object is identified on one of the touch-sensitive surface elements of the first or second regulating element in order to prevent superposition of the illuminated operator control displays and to make possible simple and clear adjustment of desired functions of the airflow of the air outlet apparatus.

The position element can therefore be realized in particular as a detection symbol, which is capable of emitting light and which is integrated between the two partial vents or the two ventilation gaps in the decorative element and which displays in an optically perceivable manner the operator control regions of the regulating elements that are optionally concealed in the decorative element. The position element is formed for example as an optical button with a segmented LED display, which is visible in a rest state when the regulating elements are not operator-controlled. By means of tapping on the position element, the regulating elements or their respective operator control displays can be activated and preferably illuminated and the detection symbol realized by the position element is deactivated.

In accordance with a further preferred development, the air outlet apparatus comprises a proximity sensor system, which is coupled in terms of signal technology to the control unit and by means of which a proximity of an object to the first or second regulating element can be identified so that the air outlet apparatus can be operated depending on measurement signals of the proximity sensor system. Such a proximity sensor system has for example a capacitive sensor, an infrared LED or a gesture camera, by means of which in each case a proximity of a hand to the first or second regulating element can be detected.

In response to an approaching hand, a previously concealed operator control field of the first and/or second regulating element can be actively switched and illuminated. In cooperation with a position element capable of emitting light, when a hand approaches, the position element can be deactivated and the operator control display of the regulating elements can be illuminated. If the hand moves away again from the decorative element or the operator control field of the regulating elements, the air outlet apparatus can change back to the rest state after a prescribed period of time of for example 3 seconds or 5 seconds or can deactivate the operator control displays of the regulating elements and retain the adjusted air stream properties.

In accordance with a further development, the air outlet apparatus comprises an object recognition sensor system, which is coupled in terms of signal technology to the control unit and by means of which a position of an object in the interior of the motor vehicle can be identified so that the air outlet apparatus can be operated depending on measurement signals of the object recognition sensor system. Such object recognition can make it possible to follow the face of the driver or the passenger using cameras so that an adjusted air stream can be readjusted. For example, the driver adjusts an airflow with a desired intensity by means of the regulating elements, said airflow being directed at said driver's head in a first seat position. The driver subsequently for example leans back so that the airflow is tracked and possibly adjusted in terms of its intensity by means of the control unit based on the object recognition sensor system so that the desired air stream is also directed at the driver's head in such a second seat position.

In accordance with a development of the air outlet apparatus, the control unit is coupled in terms of signal technology to the first and second regulating element and to a multifunction display for the motor vehicle so that the first and/or second regulating element can be actuated by means of the multifunction display and as a result the airflow can be adjusted electrically by means of the regulating elements. Such a multifunction display is formed for example as an LCD display in the dashboard region of the motor vehicle and makes it possible to adjust airflow parameters as an alternative or in addition to the above-described operator control display of the regulating elements.

In accordance with a further development, the first and/or the second regulating element each have a mechanical coupling to respective air control flaps so that the airflow can be adjusted mechanically by means of one or both of the regulating elements. The first regulating element comprises for example a rotatable annular element and the second regulating element comprises a rotatable spherical element for mechanically adjusting the airflow, which elements are each integrated into the decorative element so that the annular element surrounds the spherical element. As an alternative or in addition, the first regulating element comprises a displaceable locking element and the second regulating element comprises a displaceable sliding element for mechanically adjusting the airflow, which elements are arranged in the first or second ventilation gap so that the locking element and the sliding element are arranged one above another or next to one another.

In accordance with such configurations, the air outlet apparatus can be adjusted mechanically and the airflow entering the interior can be adapted in terms of intensity, direction and where appropriate focusing.

A further aspect of the invention relates to a system, which comprises a motor vehicle having a dashboard paneling and an embodiment of the air outlet apparatus for the interior of the motor vehicle described above, which air outlet apparatus is coupled to the dashboard paneling. Since the system comprises an embodiment of the air outlet apparatus described above, if applicable, properties and features that have been described above in connection with one embodiment of the air outlet apparatus for the interior of the motor vehicle are also disclosed for the system and vice versa.

Other objects, advantages and novel features of the present invention will become apparent from the following detailed description of one or more preferred embodiments when considered in conjunction with the accompanying drawings.

Elements with the same construction or function are characterized by the same reference signs across the figures. For reasons of clarity, where necessary, the elements illustrated are not characterized by reference signs in all of the figures.

DETAILED DESCRIPTION OF THE DRAWINGS

Figure 1:
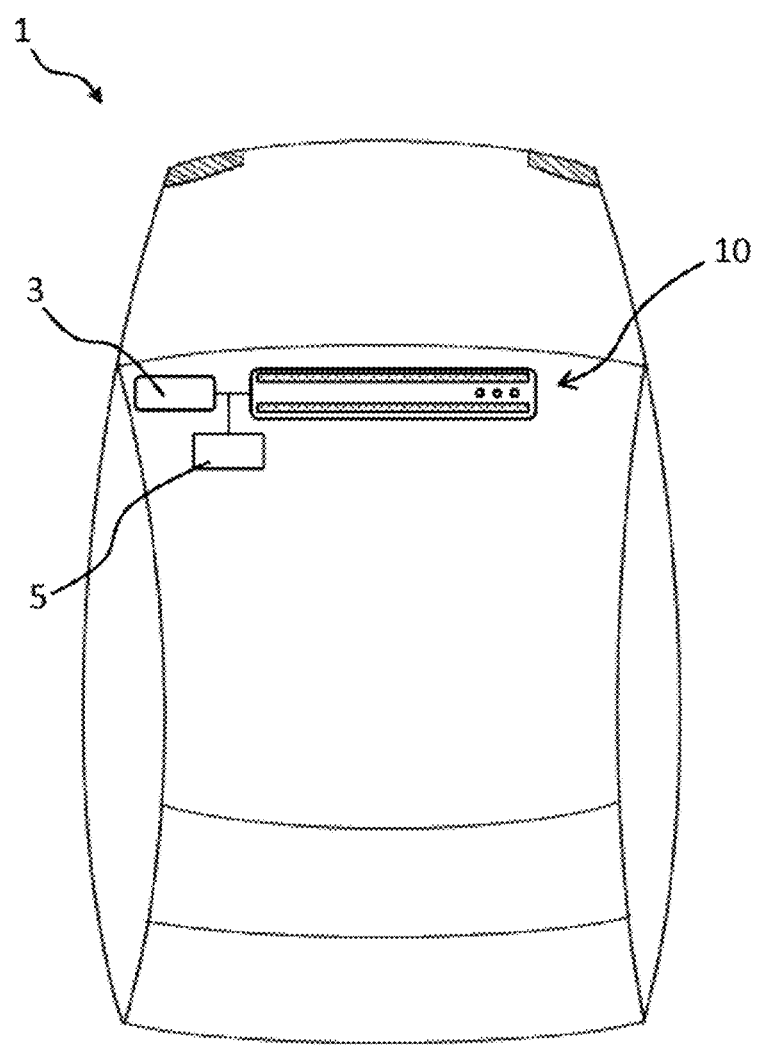
FIG. 1 is a schematic exemplary embodiment of a motor vehicle having an air outlet apparatus.

FIG. 1 illustrates an exemplary embodiment of a motor vehicle 1, which comprises an air outlet apparatus 10 for the air-conditioning of an interior of the motor vehicle 1. The air outlet apparatus 10 is coupled in terms of signal technology to a control unit 3 and a multifunction display 5 and, as is explained below based on FIGS. 2A-5, makes possible a simple and reliable operator control concept for the air-conditioning of the interior and also contributes to increased comfort of the motor vehicle 1. In particular, by means of the air outlet apparatus 10, simple and comfortable operator control of concealed air vents, such as register vents, can be realized.

Figure 2A:
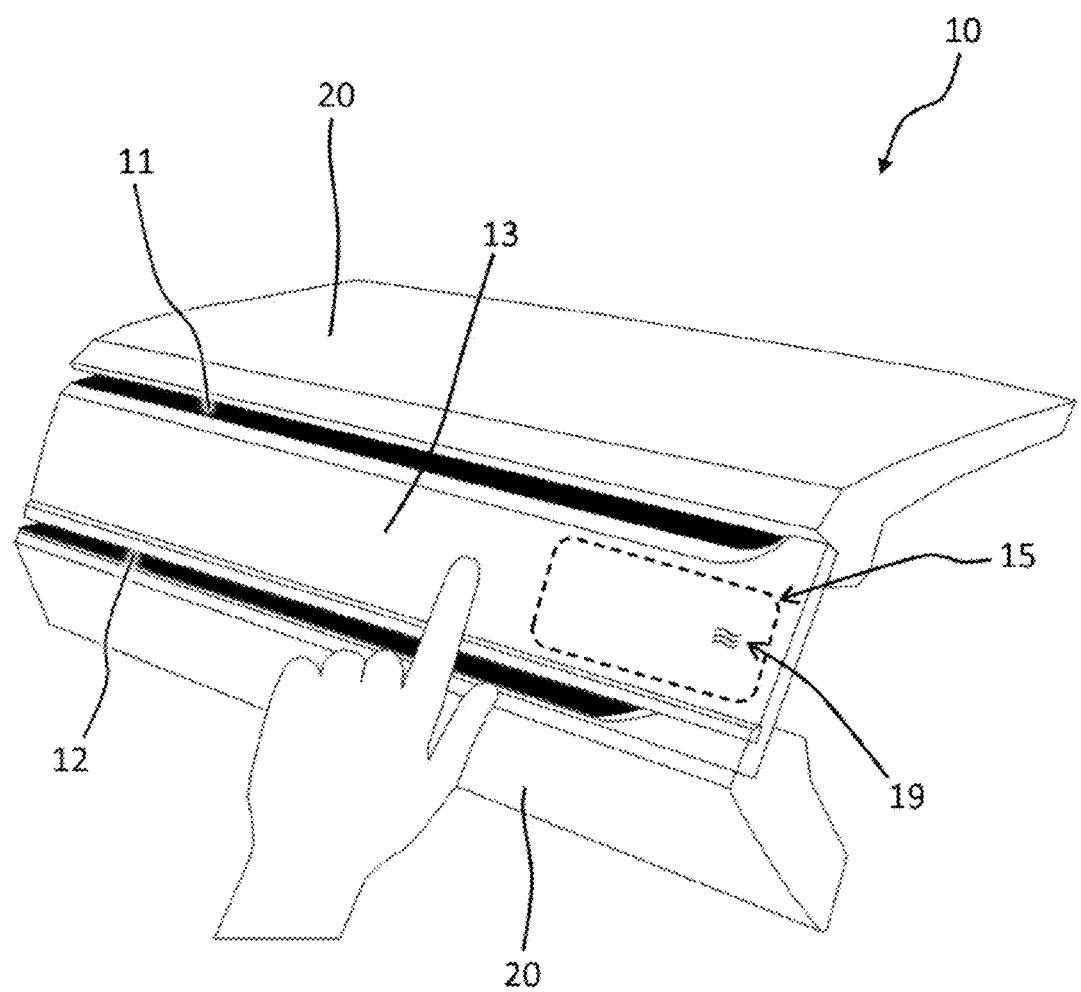
FIGS. 2A-2C show a schematic exemplary embodiment of the air outlet apparatus in perspective views.
Figure 2B:
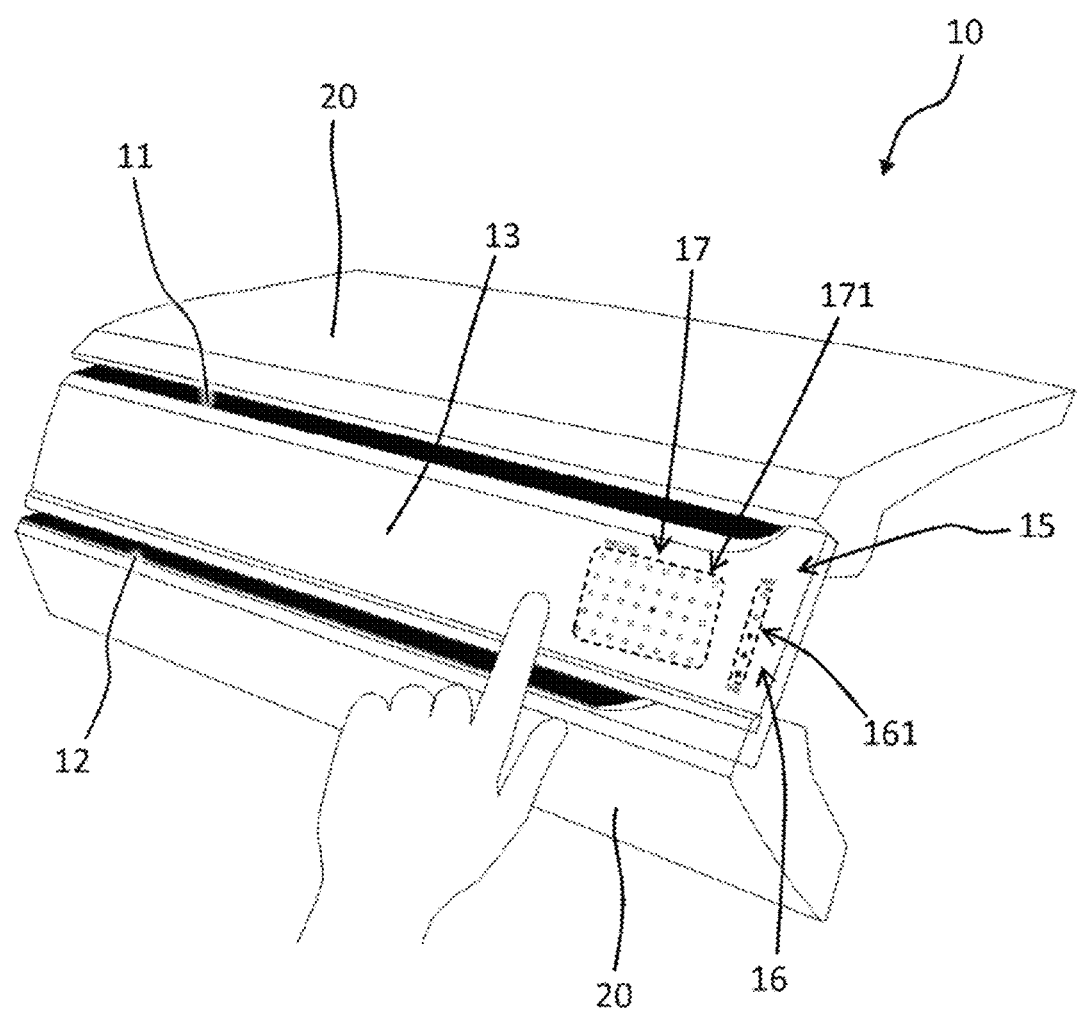
Figure 2C:
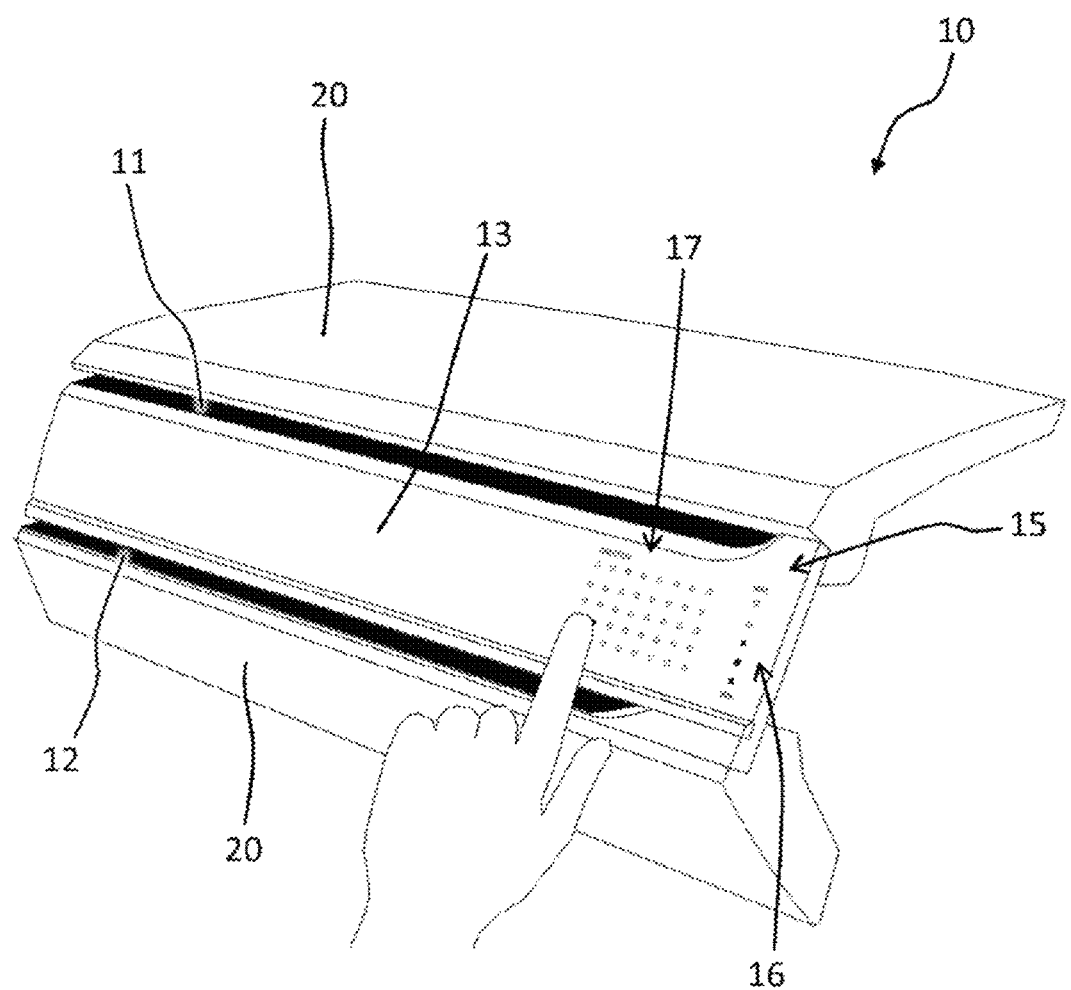

FIGS. 2A-2C show a schematic exemplary embodiment of the air outlet apparatus 10 in perspective views, which air outlet apparatus is realized as a register vent. The air outlet apparatus 10 may be arranged for example facing the driver, centrally on a dashboard of the motor vehicle 1 or facing the windshield of the motor vehicle 1 in an end region of the dashboard. The air outlet apparatus 10 comprises a first and a second ventilation gap 11 and 12, which are arranged spaced apart from one another and, in accordance with the illustrated exemplary embodiment, are oriented substantially parallel to one another.

The air outlet apparatus 10 also comprises a decorative element 13, which is coupled to a dashboard paneling 20 for the motor vehicle 1 and which is arranged between the first and the second ventilation gap 11, 12. The decorative element 13 is realized for example as a veneer through which light can at least partly shine and which delimits a bottom side of the first ventilation gap 11 and a top side of the second ventilation gap 12.

The air outlet apparatus 10 furthermore comprises an operator control unit 15, which is coupled to the decorative element 13 or is integrated in a concealed manner into said decorative element. The operator control unit 15 has a first regulating element 16 and a second regulating element 17 (see FIG. 2B). By means of the first regulating element 16, an intensity of an airflow through at least one of the ventilation gaps 11, 12 and, by means of the second regulating element 17, an alignment of the airflow through at least one of the ventilation gaps 11, 12 can be adjusted independently of one another.

Moreover, the air outlet apparatus 10 has a position element 19, which is configured to display a position of the first and second regulating element 16, 17 integrated into the decorative element 13. The position element 19 can be formed as a wave-shaped marking on the decorative element 13. The position element 19 preferably has an illuminant and is coupled in terms of signal technology to the control unit 3 so that the position element 19 can be actuated by means of the control unit 3 and emits light in an activated state and makes it possible to find the regulating elements 16, 17 in a particularly appealing and rapid manner.

The position element 19 therefore realizes in particular a detection symbol, which is capable of emitting light and which is integrated into the decorative element 13 between the two ventilation gaps 11, 12 in order to display, in an optically perceivable manner, the position of the regulating elements 16, 17 that are installed in a concealed manner in the decorative element 13. The detection symbol preferably illuminates only in a rest state in which no hand is in contact with the regulating elements 16, 17 or in which no hand is approaching the regulating elements 16, 17.

The air outlet apparatus 10 preferably also has a proximity sensor system, which is coupled in terms of signal technology to the control unit 3 and by means of which a proximity of an object, in particular a hand, to the first or second regulating element 16, 17 can be detected. The proximity sensor system is integrated for example into the decorative element 13 and has a capacitive sensor, an infrared LED or a gesture camera, by means of which in each case a proximity of a hand to the first or second regulating element 16, 17 can be identified.

When a hand approaches, the illuminating detection symbol of the position element 19 is deactivated and operator control displays with illuminants of the regulating elements 16, 17 are activated (see FIG. 2B). The operator control displays capable of emitting light are actuated by means of the control unit 3 so that all relevant display elements light up, which make it possible to adjust the airflow in terms of alignment, intensity and focusing. A currently adjusted value of a respective property is preferably actuated in such a way that it lights up with maximum brightness depending on the configuration thereof, while adjacent illuminants do not emit any light or emit light with a lower brightness.

For comfortable operator control of the air outlet apparatus 10, the regulating elements 16, 17 each have touch-sensitive surface elements 161, 171, which make it possible to electrically adjust the airflow on the basis of a respective capacitive sensor system. A corresponding operator control field with adjusting options in a polymer matrix is illustrated in FIGS. 2B and 2C.

In response to an approaching hand, a previously concealed operator control field of the first and/or second regulating element 16, 17 can therefore be actively switched and illuminated. In cooperation with a position element 19 capable of emitting light, when a hand approaches, the detection symbol can be deactivated and the operator control display of the regulating elements 16, 17 can be illuminated. By means of touching the decorative surface of the decorative element in the operator control region of the regulating elements 16, 17, a respective value can be adjusted (see FIG. 2C). A modified adjustment is implemented by means of the control unit 3 via actuating motors on the air vent, which are coupled for example to a flap mechanism of air control flaps.

When the hand is moved away from the decorative element 13 or the operator control field of the regulating elements 16, 17, the respective light-emitting operator control display remains active for a defined time and is deactivated and no longer illuminated for example only after a temporal threshold value of, for example, 3 seconds or 5 seconds in which no further contact is identified or a newly approaching hand is not detected. After such a prescribed period of time has elapsed, the respective operator control display of the regulating elements 16, 17 is switched again to the rest state thereof in which again the position element 19 illuminates by way of the detection symbol thereof according to FIG. 2A. The adjusted values for the airflow are retained in this case.

The position element 19 therefore serves as an optical button, which is visible in a rest state when the regulating elements 16, 17 are not operator-controlled. By means of tapping on the position element 19, it is possible to initiate activation and illumination of the regulating elements 16, 17 or the respective operator control displays thereof, while the position element 19 and the light-emitting detection symbol are deactivated.

Figure 3:
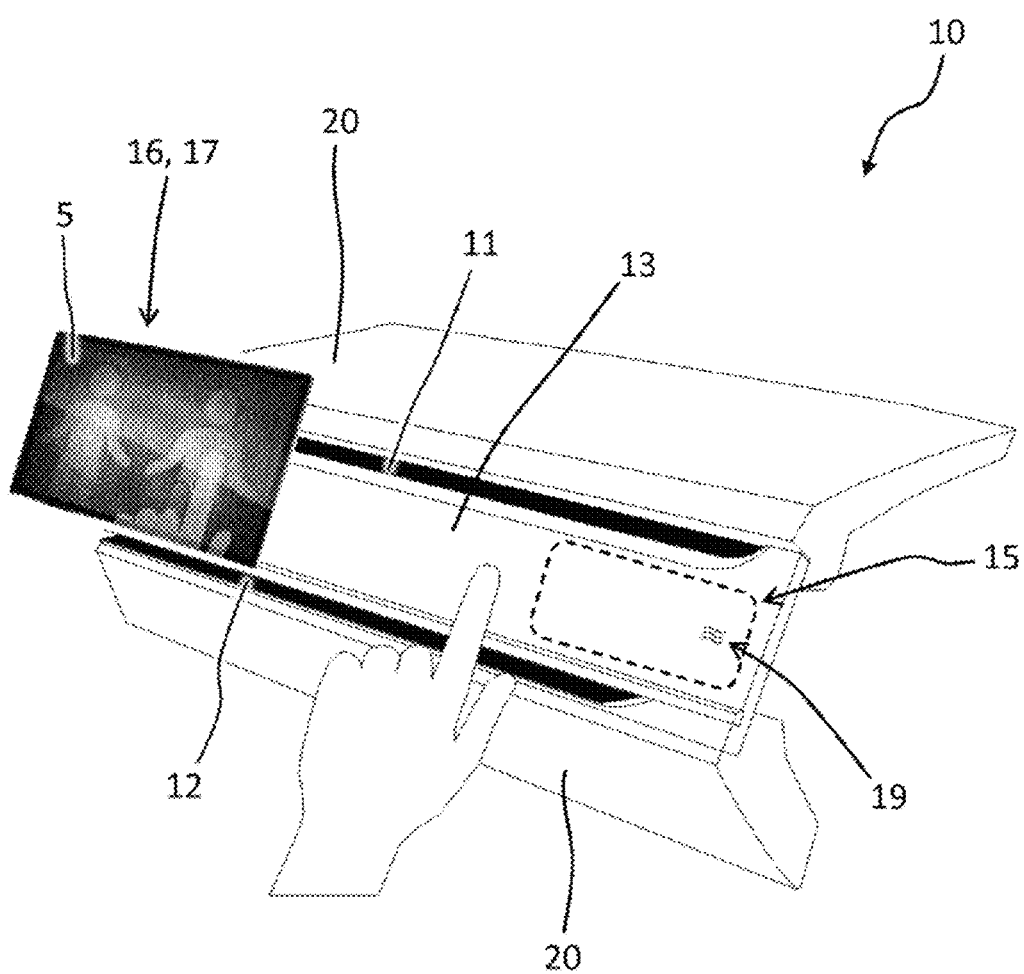
FIG. 3 shows a further schematic exemplary embodiment of the air outlet apparatus in a perspective view.

FIG. 3 shows a further exemplary embodiment of the air outlet apparatus 10 using the multifunction display 5 of the motor vehicle 1. The control unit 3 is coupled in this case in terms of signal technology to the first and second regulating element 16, 17 and to the multifunction display 5 so that the first and/or second regulating element 16, 17 can be actuated by means of the multifunction display 5 and as a result the airflow can be adjusted electrically. Such a multifunction display is formed for example as an LCD display in the dashboard region of the motor vehicle 1 and is incorporated into the display operator control concept of the air outlet apparatus 10 as an alternative or additional operator control display. Corresponding activation of the multifunction display 5 can be effected as described above by means of tapping on the detection symbol of the position element 19.

Figure 4:
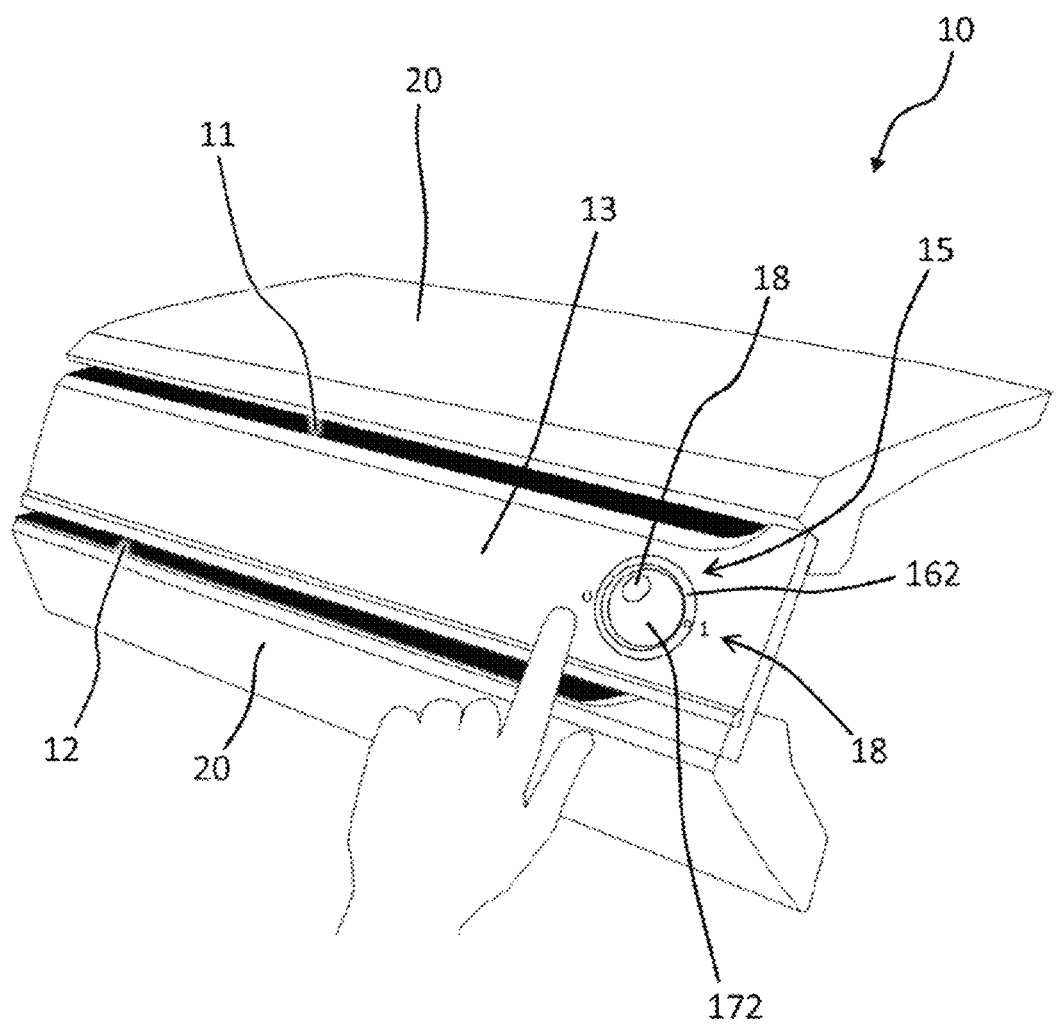
FIG. 4 shows a further schematic exemplary embodiment of the air outlet apparatus in a perspective view.
Figure 5:
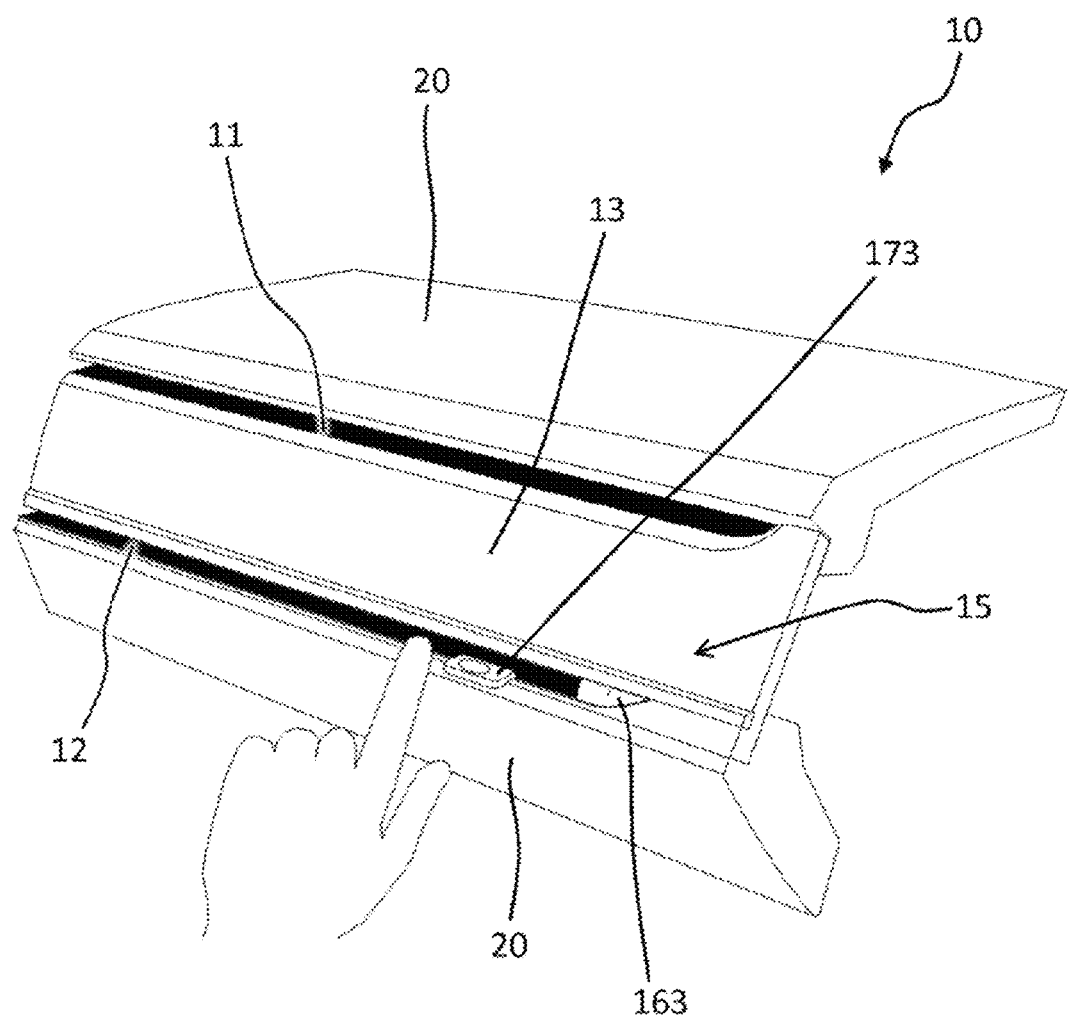
FIG. 5 shows a further schematic exemplary embodiment of the air outlet apparatus in a perspective view.

FIGS. 4 and 5 each illustrate a further exemplary embodiment of the air outlet apparatus 10, which makes it possible to mechanically adjust the air stream through the ventilation gaps 11, 12. Such mechanical control can be provided as an alternative to or in addition to the electrical control described above.

The first regulating element 16 comprises for example a rotatable annular element 162 and the second regulating element 17 comprises a rotatable spherical element 172 for mechanically adjusting the airflow, which elements are each integrated into the decorative element 13 so that the annular element 162 surrounds the spherical element 172 (see FIG. 4).

As an alternative or in addition, the first regulating element 16 can have a displaceable locking element 163 and the second regulating element 17 can have a displaceable sliding element 173 for mechanically adjusting the airflow, which elements are arranged in the lower second ventilation gap 12 so that the locking element 163 and the sliding element 173 are arranged next to one another (see FIG. 5).

In accordance with such configurations, the air outlet apparatus can be adjusted mechanically and the airflow entering the interior can be adapted in terms of its intensity, direction and focusing where appropriate using auxiliary markings 18. Such adjustment is effected by means of mechanically deflecting onto air control flaps and/or air control lamellae.

The described air outlet apparatus 10 makes possible design-compatible integration both of an air vent, in particular a register vent, and an associated display operator control element, which is preferably arranged in a concealed manner in or on the decorative element 13. The air vent is preferably formed so as to be electrified and the display operator control element makes it possible to electronically adjust the airflow, wherein one or more operator control fields are clearly visible in an operator control state, whereas they are at a minimum visible in a rest state owing to a detection symbol on the position element 19 or the position thereof in the decorative element 13 is indicated by the detection symbol.

LIST OF REFERENCE SIGNS

1 Motor vehicle
3 Control unit of the motor vehicle
5 Multifunction display of the motor vehicle
10 Apparatus
11 First ventilation gap
12 Second ventilation gap
13 Decorative element
15 Operator control unit
16 First regulating element
161 Touch-sensitive surface element
162 Annular element
163 Locking element
17 Second regulating element
171 Touch-sensitive surface element
172 Spherical element
173 Sliding element
18 Auxiliary marking
19 Position element
20 Dashboard paneling elements The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air outlet apparatus for an interior of a motor vehicle, comprising:
    a first ventilation gap and a second ventilation gap, which are arranged spaced apart from one another;
    a decorative element, which is coupled to a dashboard paneling for the motor vehicle and which is arranged between the first and second ventilation gaps;
    an operator control unit, which is coupled to the decorative element and which has a first regulating element and a second regulating element; and
    a position element, which is configured to display a position of the first and/or second regulating element in relation to the decorative element, wherein
    by way of the first regulating element, an intensity of an airflow through at least one of the first and second ventilation gaps and, by way of the second regulating element, an alignment of airflow through at least one of the first and second ventilation gaps, is adjustable independently of one another.

2. The air outlet apparatus according to claim 1, further comprising:
    a control unit, which is coupled in terms of signal technology to the first regulating element and the second regulating element, wherein
    the first and the second regulating element each have a touch-sensitive surface element, which is integrated into the decorative element so that a position of an object on one of the touch-sensitive surface elements of the first and/or second regulating element is identifiable by the control unit and as a result the airflow is controllable electrically by the regulating elements.

3. The air outlet apparatus according to claim 2, wherein the first and the second regulating element each have a capacitive operator control display having an illuminant, which operator control display is integrated into the decorative element and by which the airflow is controllable electrically.

4. The air outlet apparatus according to claim 3, wherein the control unit is configured to activate the respective illuminant of the respective operator control display in an operating state in which an object is identified on one of the touch-sensitive surface elements of the first or second regulating element.

5. The air outlet apparatus according to claim 2, wherein the position element comprises an illuminant and is coupled in terms of signal technology to the control unit, and the control unit is configured so as to (i) activate the illuminant of the position element in a rest state in which no object is identified on one of the touch-sensitive surface elements of the first or second regulating element and (ii) deactivate the illuminant of the position element in an operating state in which an object is identified on one of the touch-sensitive surface elements of the first or second regulating element.

6. The air outlet apparatus according to claim 2, further comprising:
a proximity sensor system, which is coupled in terms of signal technology to the control unit and by which a proximity of an object to the first or second regulating element is identifiable so that the air outlet apparatus is operated depending on measurement signals of the proximity sensor system.

7. The air outlet apparatus according to claim 6, wherein the proximity sensor system has a capacitive sensor, an infrared LED or a gesture camera, by which in each case a proximity of an object to the first or second regulating element is identified.

8. The air outlet apparatus according to claim 2, further comprising:
an object recognition sensor system, which is coupled in terms of signal technology to the control unit and by which a position of an object in the interior of the motor vehicle is identifiable so that the air outlet apparatus is operated depending on measurement signals of the object recognition sensor system, wherein the object recognition sensor system comprises at least one camera.

9. The air outlet apparatus according to claim 1, further comprising:
a control unit, which is coupled in terms of signal technology to the first and the second regulating element and to a multifunction display for the motor vehicle so that the first and/or second regulating element is actuatable by the multifunction display and as a result the airflow is adjustable electrically by the regulating elements.

10. The air outlet apparatus according to claim 1, wherein the first regulating element and the second regulating element each have a mechanical coupling to respective air control flaps so that the airflow is adjusted mechanically by the regulating elements.

11. The air outlet apparatus according to claim 10, wherein the first regulating element comprises a rotatable annular element and the second regulating element comprises a rotatable spherical element for mechanically adjusting the airflow, which elements are each integrated into the decorative element so that the annular element surrounds the spherical element.

12. The air outlet apparatus according to claim 10, wherein the first regulating element comprises a displaceable locking element and the second regulating element comprises a displaceable sliding element for mechanically adjusting the airflow, which elements are arranged in the first or second ventilation gap so that the locking element and the sliding element are arranged above one another or next to one another.

13. A system, comprising:
a motor vehicle having a dashboard paneling; and
an air outlet apparatus for the interior of the motor vehicle according to claim 1, which is coupled to the dashboard paneling.

14. An air outlet apparatus for an interior of a motor vehicle, comprising:
a first ventilation gap and a second ventilation gap, which are arranged spaced apart from one another;
a decorative element, which is coupled to a dashboard paneling for the motor vehicle and which is arranged between the first and second ventilation gaps;
an operator control unit, which is coupled to the decorative element and which has a first regulating element and a second regulating element;
a control unit, which is coupled in terms of signal technology to the first regulating element and the second regulating element; and
a proximity sensor system, which is coupled in terms of signal technology to the control unit and by which a proximity of an object to the first or second regulating element is identifiable so that the air outlet apparatus is operated depending on measurement signals of the proximity sensor system, wherein
by way of the first regulating element, an intensity of an airflow through at least one of the first and second ventilation gaps and, by way of the second regulating element, an alignment of airflow through at least one of the first and second ventilation gaps, is adjustable independently of one another.

15. The air outlet apparatus according to claim 14, wherein
the first and the second regulating element each have a touch-sensitive surface element, which is integrated into the decorative element so that a position of an object on one of the touch-sensitive surface elements of the first and/or second regulating element is identifiable by the control unit and as a result the airflow is controllable electrically by the regulating elements.

16. The air outlet apparatus according to claim 15, wherein
the first and the second regulating element each have a capacitive operator control display having an illuminant, which operator control display is integrated into the decorative element and by which the airflow is controllable electrically.

17. The air outlet apparatus according to claim 16, wherein
the control unit is configured to activate the respective illuminant of the respective operator control display in an operating state in which an object is identified on one of the touch-sensitive surface elements of the first or second regulating element.

18. The air outlet apparatus according to claim 14, further comprising:
a position element, which is configured to display a position of the first and/or second regulating element in relation to the decorative element.

19. The air outlet apparatus according to claim 14, wherein
- the position element comprises an illuminant and is coupled in terms of signal technology to the control unit, and
- the control unit is configured so as to (i) activate the illuminant of the position element in a rest state in which no object is identified on one of the touch-sensitive surface elements of the first or second regulating element and (ii) deactivate the illuminant of the position element in an operating state in which an object is identified on one of the touch-sensitive surface elements of the first or second regulating element.

20. The air outlet apparatus according to claim 14, wherein
- the proximity sensor system has a capacitive sensor, an infrared LED or a gesture camera, by which in each case a proximity of an object to the first or second regulating element is identified.

* * * * *